Patented Aug. 21, 1945

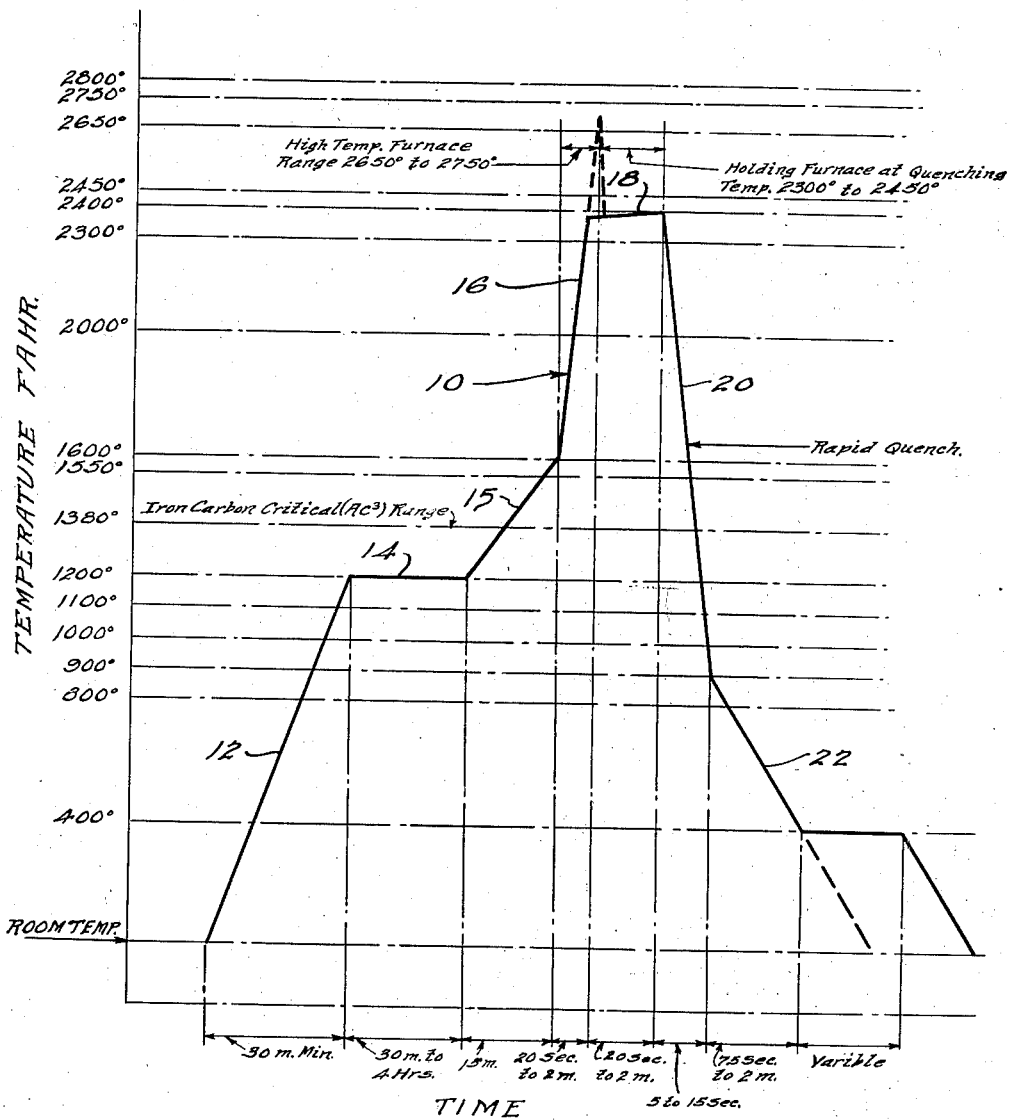

2,383,299

UNITED STATES PATENT OFFICE 2,383,299

HEAT-TREATING HIGH-SPEED TOOL STEEL

Frederick A. Endress, Detroit, Mich., assignor to Tuff-Hard Corporation, Detroit, Mich., a corporation of Michigan Application September 6, 1943, Serial No. 501,394

2 Claims. (Cl. 148—21.55)

This invention relates to the heat treatment of high-speed tool steels and has for its principal object the provision of certain step or steps of operation in the heat treatment of high-speed tool steels that will result in a cutting tool of superior characteristics.

Objects of the invention include the provision of a method of heat-treating high-speed tool steel that will result in a tool of superior hardness and toughness; the provision of a method of heat-treating high-speed tool steel by the practice of which a cutting tool having a superior cutting edge will be provided; the provision of a method of heat-treating high-speed tool steel by the practice of which a cutting tool may be provided in most cases capable of producing a much smoother surface on a part machined thereby than has heretofore been possible with high-speed tool steels treated in a conventional manner, and at the same time the tool will embody a superior hardness and toughness as compared to high-speed tools heat-treated in a conventional manner; the provision of a method of heat-treating high-speed tool steel in which cutting tools formed therefrom will wear longer than such tools formed from high-speed tool steel heat-treated in the usual manner; the provision of a method of heat-treating high-speed tool steel by means of which a more uniform dispersion of the undissolved carbides can often be obtained; and the method of heat-treating high-speed tool steel by the practices of which the steel may be brought to a desired quenching temperature in a shorter period of time than is possible by conventional methods, whereby to minimize damage to the steel because of the high temperature and enabling the beneficial results above enumerated to be obtained.

The above being among the objects of the present invention the same consist in certain novel steps and combinations of steps of operation to be hereinafter described with reference to the accompanying drawing, and then claimed, having the above and other objects in view.

The accompanying drawing shows a graph illustrating the time and temperatures preferably employed in the treatment of high-speed tool steel and including the steps of the present invention.

The present invention is particularly directed to so-called high-speed tool steel and particularly to those having tungsten, molybdenum, or some equivalent element alloyed therewith, which tool steels have what is known as a secondary hardness range when subjected to drawing operations or heat treatments in the neighborhood of from 900° F. to 1125° F. after hardening.

It is well understood by those skilled in the art that such high-speed tool steel should be hard in order to provide the proper character of cutting edge and be capable of maintaining such cutting edge in service, and yet it should have the characteristic of being tough so that the cutting edge will not break down under impact or the tool itself break under the load of the cutting operation. In my copending application for Letters Patent of the United States for improvements in process for heat-treating steel, Serial No. 370,577, filed December 18, 1940, which has matured into Patent Number 2,364,893, I have disclosed a method of heat-treating high-speed tool steel by the practice of which tool steels having a uniform hardness of better than sixty-five Rockwell C has been obtained with a uniform toughness or tensile strength of more than 500,000 pounds per square inch. Except for the specific steps of operation disclosed herein for bringing the high-speed tool steel from the preheat temperature to the quenching temperature and which constitutes the gist of the present invention, the remaining steps of operation disclosed in my prior application above identified may be, but are not necessarily, followed in carrying out the complete sequency of heat-treating operations required to bring a high-speed tool steel part to its finally hardened condition in accordance with the present invention. In other words, it will be understood, for the purpose of explanation only, that the steps of operation, outside of those constituting the present invention, required to complete the full heat-treatment of a piece of high-speed tool steel, may be those steps disclosed in my prior application above identified or may be equivalent conventional steps such as are employed in the industry.

It has been generally understood in the art that in bringing high-speed tool steel to a quenching temperature, the steel must be brought to a temperature from about 2150° F. to 2450° F., depending upon the composition of the material from which the particular tool is made, from the preheat temperature of around 1500° F. to 1650° F., as quickly as possible and held at this high temperature for only substantially a sufficient length of time to insure the tool being substantially uniformly heated throughout, then immediately quenched, in order to obtain the desired hardness without burning the tool. This heating of the tool steel parts from the preheat temperature to the quenching temperature is conventionally carried out in a single furnace, and even with the best practices followed at the present time the corners and the edges of the tools are frequently burned, or the grain of the steel rendered too coarse, either of which may render the tools unusable.

In accordance with the present invention the tool at the preheat temperature is placed in a furnace maintained at a temperature sufficiently in excess of the desired quenching temperature of the tool to provide a head of heat capable of raising the tool quickly to approximately the quenching temperature, and when the part has remained in the high-heat furnace for a sufficient length of time to raise it approximately to the quenching temperature, it is immediately withdrawn and placed in a second furnace maintained substantially at and preferably with a small head of heat beyond the quenching temperature desired for the tool being treated. It is allowed to remain in the second furnace only for a sufficient length of time to insure the part being substantially uniformly heated throughout and the desired carbide transformations having taken place, upon which it is immediately withdrawn and quenched. I have found that by following out this procedure high-speed tool steel parts may be raised to a quenching temperature which is substantially uniform throughout the part in a much shorter time than in accordance with conventional practices and eliminates to a great extent the danger of burning the corners or edges of the parts thus being heated.

By the practice of the steps of the present invention, not only do the heat-treated high-speed steel parts have a hardnes and toughness equal to that obtained by following out the method of my copending application above identified, but in fact produce high-speed steel parts having even a superior quality of toughness and hardness. Additionally, I have found that high-speed tool speed cutting tools produced in accordance with the present invention are usually capable of machining a smoother surface on a piece of metal work and the tool holds the cutting edge in a superior condition for a longer time than when heat-treated either by conventional methods or by the method disclosed in my copending application above identified. While the exact reason for this superiority may not be positively known, it appears from microphotographs of sections of high-speed tool steel heat-treated in accordance with the present invention that the superiority may result to a great measure from a breaking down of the undissolved carbides into smaller particles which are more closely spaced and more uniformly dispersed throughout the mass of the tool than occurs in such high-speed tool steel when heat-treated in accordance with conventional practice or by the practice disclosed in my copending application above referred to.

By following out the practices of the present invention, however, it is found that the particles of undissolved carbide are usually smaller than provided in the conventional or older practice and that these carbides are usually more uniformly dispersed through the material of the tool forming a matrix therefor and are more closely arranged with respect to each other than the larger particles resulting in the older practice. When this occurs a finer cutting edge is obtained, resulting in many cases in smoother work cut by the tool.

In the accompanying drawing I have graphically illustrated the preheat, the high-temperature heat, and the quench embodied in a preferred series of steps in heat-treating high-speed tool steel in accordance with the present invention, it being understood that the gist of the present invention is the high-temperature heat or those steps of operations employed in bringing a high-speed tool steel part from the preheating temperature to the quenching temperature. The preheating and the quenching steps, while preferably substantially the same as that disclosed in the graph, are not necessarily restricted thereto, as any satisfactory preheating step, quenching step, drawing, and other steps may be employed, and the resulting tool will be found to be benefited by the practices of the present invention.

The first step shown in the graph, in carrying out the heat treatment of high-speed tool steel, including the steps of the present invention is the preheat. While, as above described, the preheat may be carried out in any suitable or conventional manner, I find it preferable to preheat the steel from room temperature by applying radiant heat thereto. This is preferably carried out by placing the steel piece being processed in a ceramic retort which is preferably externally heated and constructed to uniformly conduct the heat to the steel by radiation. The steel is thus initially heated to a temperature of approximately at least 1000° F. but less than the iron carbon critical $AC^3$ range, as indicated in the graph by that portion of the curve designated by the numeral 12. In most instances, I find it desirable to heat the steel in this first preheat to a temperature of from 1100° to 1250° F., and preferably to about 1200° F. and this heat is preferably within a minimum time of about thirty minutes for all standard sections up to ¾" square. This minimum time is preferably increased approximately about ten minutes for each ⅛" square increase in dimension. Preferably, the time control during this heating operation is had by shielding the steel being heat-treated in any suitable manner, so as to permit the absorption of heat by the steel at a certain predetermined rate, whereby to uniformly increase the temperature of the steel material up to at least 1000° F. and to the preferred temperature as mentioned above within the predetermined time.

Next the high speed tool steel is allowed to soak at this temperature for a period of time varying from about thirty minutes to four hours or thereabouts, indicated in the graph by that portion of the curve designated by the numeral 14, thereby permitting an isothermal change to take place in the iron structure, this change resembling in some respects the change which takes place in the standard spheroidizing process and it also allows the carbide forming elements to be freed.

After the soaking of the steel at the above specified temperature has been completed the steel is then raised slowly to a degree slightly above the iron-carbon critical ($AC^3$) range, and preferably to about 1500° F. and preferably not exceeding a maximum of 1650° F., but preferably within a minimum of about fifteen minutes for sections up to three-fourths (¾) inch square, which time is increased approximately five minutes for each one-eighth (⅛) inch square increase in dimension. This step, which is illustrated in the graph by that portion of the curve designated by the numeral 15, may be carried out in any suitable or conventional manner but I prefer to uniformly heat the steel by placing the same in a heated ceramic retort or other suitable retort providing for a radiation of heat from the retort to the steel being treated. The time of this heat is also preferably controlled by employing shielding around the steel being treated, in order to regulate the amount of heat being conducted by radiation to the steel per unit of time. It will be observed that the steel is thus heated and relatively slowly passes through the iron-carbon critical (AC³) range, but in this step, the steel is never allowed to soak at this temperature of about 1550° F. as it is immediately raised to the quenching temperature as quickly as possible, preferably by means of radiant heat or by induction heating but broadly by any suitable or conventional means which will uniformly heat the steel to the required temperature within the time prescribed. Preferably the steel being treated is raised to a quenching temperature in a carbonaceous gas, in a vacuum, or in any atmosphere which will not support combustion, but this is not essential.

The next two steps constitute the gist of the present invention and consists, first in placing the steel in a furnace or the like having a material head of heat above the quenching temperature, and second, then transferring it to a furnace or the like substantially at the quenching temperature, the two steps being combined to quickly raise the steel to the quenching temperature.

The ideal time for heat treating the steel from the preheat temperature to the quenching operation is preferably from less than a minute to a few minutes, depending upon the size and shape of the piece of work being treated. As an example, in a tool bit of ⅜" square it would require a minimum of about up to two minutes, while a ¾" square bit may require about two and one-half minutes, and not more than approximately three minutes.

Quenching temperatures vary for different types of high-speed tool steel material from 2150° F. to 2450° F., and in order to raise the steel piece being treated to the desired quenching temperature it is preferable to heat the first furnace, ceramic retort or other container used in these two steps to a temperature which will provide a head of heat at least 200° F., and preferably 300° F., or more above the desired quenching temperature, and preferably at a temperature of from 2650° F. to 2950° F., probably averaging for most sizes and material, about 2800° F. Higher temperatures may be advantageously employed but under present designs in the furnace art these are about the highest temperatures that can be consistently maintained without undue destruction of the furnaces.

In all cases, independent of the size and/or analysis of the steel piece being treated, it is preferable to heat the steel material in as short a time as is possible to or as near as possible to the ideal high temperature at which the carbides tend to go into solution. In most high speed tool steels, I have found that this ideal point of transformation is near the highest temperature to which the steel can be heated without surface or interior disintegration, and in all materials can be found by experiment at or near the ideal for each analysis.

High speed tool steels will all harden to a degree at a point considerably below this ideal high temperature, but if the time for heating the steel increases substantially beyond the limits prescribed, there is a noticeable structural characteristic that is inferior. Therefore, to give the treated material the highest working efficiency combined with strength and hardness, it is necessary to eliminate so far as is practical, any partial transformation of the carbide forming elements at the lower range of temperature, where such transformations take place. Thus my present process is particularly directed to an improved method whereby the high speed tool steel material is quickly heated to or near this ideal high temperature, and subsequently held at this prescribed ideal high temperature for a period of time sufficient to allow the desired degree of carbide transformation to take place.

For example, in heat treating a one-half (½) inch square section according to my process, the ideal temperature when the carbide forming elements go into solution to obtain maximum working characteristics combined with strength and hardness, for a steel such as 18–4–1 high speed tool steel, is approximately 2400° F. More particularly this high speed tool steel is thus first heated to a degree as near to 2400° F. as is practical in about forty (40) seconds in a furnace with an initial head of heat of preferably from 300° F. to 450° F. above the said 2400° F. For example, this furnace may be heated to from about 2700° F. to about 2950° F., as indicated by the dotted extension of that portion of the curve designated by the numeral 16 in the graph which indicates this particular step of operation, which is sufficient to heat the steel to a degree approaching the desired high temperature in the aforesaid forty (40) seconds. The steel is then immediately transferred to a second high temperature furnace which has a temperature of at least 2400° F. and preferably at a temperature not materially exceeding 2450° F., and is held therein until the temperature of the piece is substantially uniform throughout, in a time limit not exceeding twenty (20) seconds, as indicated in the graph by that portion of the curve designated by the numeral 18. After the piece has attained this temperature substantially uniformly throughout it is held in this last furnace from zero seconds to about one and one-half minutes, depending upon the results desired and the size of piece. For the ordinary run of work the material will usually be held in the holding furnace for from thirty (30) seconds to one minute after attaining a uniform temperature throughout. In this connection it will be appreciated that the longer the piece is held in this last furnace the harder will be the resulting tool, and the shorter the time the tougher the tool. It will be noted that under proper operating conditions, the second furnace will raise the temperature of the steel more slowly throughout its entire mass to or near the desired high temperature within the above prescribed time interval and will cause a proper transformation of the carbides to take place.

For tool steels of a different analysis, the above desired high temperature will be varied within the limits described above, and for steel pieces of different sizes and shapes, the time element will be varied accordingly but substantially within the limits prescribed. For such steel pieces, which are smaller in cross-section than the specific example described above, the time will be lesser, and for larger steel pieces, the time will be greater, as will be appreciated.

The above described high heat is preferably accurately controlled by introducing the material being heat treated which has been preheated to a temperature of about 1550° F. in a high temperature furnace whose initial temperature ranges from approximately 2650° F. to 2950° F. The material is left in this first furnace for periods of time varying from approximately twenty seconds to one minute and possibly not exceeding a total time of two minutes. Due to the excessive heat in this furnace the steel material is very rapidly heated to a degree very close to the predetermined ideal high temperature. In order to more accurately control the temperature of the work when same is to be quenched, I find it desirable to remove the material from this first high temperature furnace and immediately introduce same into a second furnace identified broadly as a holding furnace. This second furnace is preferably heated to an initial temperature of a maximum of approximately 50° F. above the desired quenching temperature and thus there is only a slight head of heat in this second furnace, thus permitting the temperature of those portions of the steel not already at the desired temperature to be more slowly raised to the ultimate quenching temperature and be uniformly heated throughout its mass. I find it desirable to leave the steel material being heat treated in this second furnace for predetermined timed periods varying in accordance with their size and shape, as previously mentioned.

The quenching temperatures of this class of steel materials vary somewhat, depending upon the analysis of the steel alloy being processed and also depending upon the application of the cutting tool. I find that usually the desirable quenching temperatures vary from approximately 2150° F. to 2450° F. and in all cases the first high temperature furnace is heated to a degree so that it will give up heat to the material to raise the temperature of the material to approximately the desired quenching temperature, preferably to a degree only 25° or 50° F. less than the ultimate temperature in the prescribed time, and the second furnace gives up heat to the steel at a slower rate, so that a small variation in the timing during the heating of the steel in the second furnace will not substantially vary the ultimate temperature of the work. This way, the work, or the various types of tool steel pieces being processed, is withdrawn from the second furnace and immediately quenched. This operation results in a more uniform product and eliminates, to a large extent, non-uniformity in results due to production variations in timing, caused by the human element involved in carrying out my process.

When the steel material being treated has reached the predetermined quenching temperature and has been held at that temperature for the desired length of time, the same is then quenched. While the quenching may be done in any suitable manner in the broader aspects of the invention, preferably it is introduced into a quenching medium substantially in a manner as described in the aforesaid copending application. The material is thus preferably quenched from the quenching temperature to a temperature of approximately 900° F., as shown by that portion of the curve in the graph indicated at 20, within a time interval varying from five (5) to fifteen (15) seconds. Next the steel is preferably somewhat more slowly quenched to approximately 400° F., as shown by that portion of the curve in the graph indicated at 22, at which point same may be soaked at this temperature for variable time intervals and then quenched to room temperature, or brought directly to room temperature particularly with the less dense materials, as optionally indicated in the graph. Subsequent to this quenching operation the steel is then subjected to suitable or conventional drawing heats commencing at either 400° F. or room temperature, or in substantial accordance with the drawing operations as described in my aforesaid copending application, to bring the steel to its finally heat treated condition.

From the above it will be appreciated, as previously described, that a high-speed tool steel part which has been heat-treated according to the steps of the present invention and which has been subsequently properly drawn not only results in a part of maximum hardness and toughness, but one in which in most cases the cutting edge thereof will include smaller and more evenly dispersed particles of undissolved carbides which impart to the tool the characteristics of being able to produce smoother finishes on metal parts finished thereby than is possible with a high-speed tool steel made from the same material and heat-treated in accordance with the conventional practice and, at the same time, the cutting edge will maintain its sharpness and smoothness for a greater length of time in service.

What is claimed is:

1. A process of heat treating a preheated high-speed tool steel having a secondary hardness range upon drawing, comprising the steps of heating of said steel from a starting temperature of about 1500° F. and not in excess of 1650° F. approximately to a quenching temperature of 2150° to 2450° F. in a furnace having a sufficient head of heat to raise the temperature of an outer layer of the steel to said temperature within a time period of from about twenty seconds to about one and one-half minutes, immediately transferring said steel into a second furnace of a temperature approximately the same as the quenching temperature and holding said steel in said furnace for a period of time of from about twenty seconds to two minutes, and then quenching the steel.

2. In a process for heat treating high-speed tool steel having a secondary hardness range upon drawing, and which has been preheated to a temperature of about 1500° F. and not exceeding about 1650° F., a method of controlling the heating of the steel to a quenching temperature of 2150° to 2450° F. consisting in the steps of subjecting the steel to a furnace temperature of several hundred degrees F. in excess of the desired quenching temperature for a period of time of from about twenty seconds to about one and one-half minutes in order that the carbide transformations will take place as near to the desired quenching temperature as is possible, removing said steel from said furnace within said time limit and as soon as the temperature of an outer layer thereof has been raised to approximately the desired quenching temperature and immediately transferring said steel at the last-mentioned temperature thereof to a second furnace whose temperature is substantially the same as said quenching temperature, and holding the steel in said second furnace for such length of time as to cause the desired degree of carbide transformation to take place in said steel, and then quenching said steel.

FREDERICK A. ENDRESS.